United States Patent [19]

Stratton

[11] Patent Number: 5,781,151
[45] Date of Patent: Jul. 14, 1998

[54] INTERFEROMETRIC TRAJECTORY RECONSTRUCTION TECHNIQUE FOR FLIGHT INSPECTION OF RADIO NAVIGATION AIDS

[75] Inventor: Donald A. Stratton, Westbury, N.Y.

[73] Assignee: Parker-Hannifin Corporation, Cleveland, Ohio

[21] Appl. No.: 716,015

[22] Filed: Sep. 19, 1996

[51] Int. Cl.[6] ............................ G01S 5/02; H04B 7/185
[52] U.S. Cl. ............................................................ 342/357
[58] Field of Search .................................. 342/352, 353, 342/356, 357, 422, 424, 450, 451, 457, 463; 364/449, 452, 450, 451, 465, 554; 455/54.1; 379/60

[56] References Cited

U.S. PATENT DOCUMENTS

| | | | |
|---|---|---|---|
| 3,836,970 | 9/1974 | Reitzig . | |
| 3,964,066 | 6/1976 | Nemit . | |
| 4,359,733 | 11/1982 | O'Neill . | |
| 4,839,656 | 6/1989 | O'Neill . | |
| 4,894,655 | 1/1990 | Joguet et al. . | |
| 4,965,586 | 10/1990 | O'Neill et al. . | |
| 5,009,245 | 3/1992 | Sagey . | |
| 5,017,926 | 5/1991 | Ames et al. . | |
| 5,072,227 | 12/1991 | Hatch . | |
| 5,126,748 | 6/1992 | Ames et al. | 342/353 |
| 5,148,179 | 9/1992 | Allison | 342/357 |
| 5,177,489 | 1/1993 | Hatch | 342/357 |
| 5,194,871 | 3/1993 | Counselman, III | 342/357 |
| 5,296,861 | 3/1994 | Knight | 342/357 |
| 5,307,289 | 4/1994 | Harris | 364/516 |
| 5,317,514 | 5/1994 | Bancroft et al. | 364/449 |
| 5,359,332 | 10/1994 | Allison et al. | 342/357 |
| 5,361,212 | 11/1994 | Class et al. | 364/428 |
| 5,365,450 | 11/1994 | Schuchman et al. | 364/449 |
| 5,412,389 | 5/1995 | Olds | 342/357 |
| 5,422,813 | 6/1995 | Schuchman et al. | 364/449 |
| 5,438,337 | 8/1995 | Aguado | 342/357 |
| 5,440,491 | 8/1995 | Kawano et al. | 364/443 |
| 5,442,363 | 8/1995 | Remondi | 342/357 |
| 5,444,450 | 8/1995 | Olds et al. | 342/357 |

*Primary Examiner*—William L. Oen
*Attorney, Agent, or Firm*—Christopher H. Hunter

[57] ABSTRACT

A system for flight inspection of radio navigation aids is disclosed in which a interferometric trajectory reconstruction technique (ITR) is employed. The ITR system combines data from a ground-based reference unit at a fixed location with data from a mobile unit on the aircraft. Single-frequency Global Navigation Satellite System (GNSS) receivers in the units provide a sequence of measurement data for each navigation satellite in view. Additional data is collected from the aircraft's radio altimeter when the aircraft passes over the threshold of the runway. The aircraft's trajectory is determined at the end of the time interval under analysis, after all measurements have been received. ITR employs a unique procedure to establish the exact distance from the aircraft to each of several GNSS satellites using both pseudo-range and carrier signal information. The aircraft's position is determined from these distances using a least-squares adjustment procedure. The ITR distance-determination procedure is based on the fact that the aircraft-to-satellite distance is proportional to the total phase of the carrier signal. The total carrier phase consists of an accumulated phase and in initial integer ambiguity. While the accumulated phase is measured directly by the GNSS receiver, the integer ambiguity is resolved by using an iterative search for the correct integer set within a search volume defined by the a-priori uncertainty in aircraft's position. The ITR system uses the aircraft's radio altimeter to constrain the search volume.

5 Claims, 2 Drawing Sheets

Table 1. Flight Test Results

| Solution Evaluated | Cross-track 2σ accuracy | Along-track 2σ accuracy | Vertical 2σ accuracy | Worst-case track error | Worst-case vertical error |
|---|---|---|---|---|---|
| ITR | Fix + 2 cm | Fix + 3 cm | Fix + 6 cm | Fix + 5 cm | Fix + 13 cm |
| Carrier-smoothed code | 0.75 m | 0.30 m | 1.80 m | 1.07 m | 1.87 m |
| Code | 1.47 m | 0.63 m | 2.52 m | 2.11 m | 3.95 m |

5,781,151

INTERFEROMETRIC TRAJECTORY RECONSTRUCTION TECHNIQUE FOR FLIGHT INSPECTION OF RADIO NAVIGATION AIDS

FIELD OF THE INVENTION

The present invention relates generally to systems for trajectory determination, and more specifically to systems for the flight inspection of radio navigation aids.

BACKGROUND OF THE INVENTION

The Federal Aviation Administration (FAA) and international agencies perform flight inspection of their radio navigation aids to comply with International Civil Aviation Organization (ICAO) requirements. Flight inspection systems require a highly accurate aircraft tracking capability. Generally, the system's accuracy must be at least three times more accurate than the navigation aid itself. Over the years, many governments have adopted ground-based systems such as manually-operated optical theodolites and radio telemetry theodolites for aircraft positioning. However, these systems are limited by visibility, turbulence, and operator performance. Automatic systems such as portable laser and infra-red tracking systems can offer improved features, but tend to have a higher cost and can still suffer from some of the drawbacks of the above manual systems. With requirements to inspect thousands of radio navigation facilities worldwide, the FAA has abandoned ground-based tracking systems in favor of Automatic Flight Inspection Systems (AFIS). These systems use on-board Inertial Navigation Systems (INS) and other airborne sensors for positioning, thereby eliminating weather dependency, visibility limitations, and ground equipment. Presently, Parker Gull AFIS in service with the FAA perform the bulk of all flight inspection in the United States using INS. Parker Gull AFIS are also used by several international governments, including the Japan Civil Aviation Bureau. While INS has many advantages over previous systems, it is believed that there is a demand for a lower cost system which still maintains high accuracy and is not limited by atmospheric conditions or operator performance.

It is known that a satellite-based positioning, such as the U.S. Global Positioning System (GPS), has become accepted for accurately determining the position of a receiver in three-dimensional space. In fact, GPS is currently used in conjunction with INS for AFIS. In a GPS system, a number of satellites orbiting the earth in well-defined polar orbits continually broadcast signals indicating their precise orbital positions. Each satellite broadcasts two modulated carrier signals $L_1$ and $L_2$, at 19 cm and 24 centimeters, respectively. The same two frequencies are used in transmitting from all of the satellites, but the satellites have unique pseudo-random digital codes (coarse-acquisition (C/A) ranging codes) that are used to modulate the $L_1$ and $L_2$ carrier signals. Each satellite signal is based on a precision internal clock, and the multiple clocks are effectively synchronized by ground-based stations. The receivers detect superimposed modulated carrier signals and measure either (or both) of the code and carrier phase of each detected signal, relative to their own internal clocks. Even though a receiver clock is not synchronized with the satellite clocks, a receiver can nevertheless determine the "pseudo-range" to each satellite based on the relative time of arrival of the signals, and the receiver position can then be mathematically determined from the pseudo-ranges and the known positions of the satellites. The clock error between the receiver's time reference and the satellite clocks can be eliminated by the availability of signals from an additional satellite. To solve for three unknown positional coordinates and the clock error, four satellite signals are required.

Although the above technique provides reasonable accuracy in horizontal position, it has been determined that using only the pseudo-range to each of the satellites does not provide sufficient vertical accuracy for all applications, for example precision landing aid verification.

It is known that certain systems have been developed to take advantage of the carrier signals from the satellites to increase the vertical position accuracy (see e.g., Class, U.S. Pat. No. 5,361,212 and Hatch, U.S. Pat. No. 5,177,489). Nevertheless, it is believed that the prior systems have still not reached the level of accuracy and reliability (in both vertical and horizontal positioning) which is required for precision applications such as landing aid verification. In addition, it is believed that the techniques which have been developed to resolve ambiguities in the carrier signals can be cumbersome and require specialized (costly) equipment. Still further of these systems, and in particular, pseudo-satellite systems, require additional reference and mobile equipment, including pseudo-satellite transmitters on the ground and downwardly-facing Global Satellite Navigation System (GNSS) antenna installations on the aircraft. Also, dual-frequency systems (such as shown in Remondi U.S. Pat. No. 5,442,363) require the installation of a non-typical dual-frequency antenna on the aircraft. Dual-frequency systems further require the reception of both GNSS frequencies, which can pose operational difficulties. As such, it is believed that there is a demand for a system that provides high accuracy trajectory determination using relatively low-cost, commercially-available equipment.

SUMMARY OF THE INVENTION

The present invention provides a novel and unique system for trajectory determination, and more specifically provides a system for the flight inspection of radio navigation aids that has high accuracy and low cost. The system uses a Interferometric Trajectory Reconstruction technique (ITR), which is based on interferometric measurement of signals from Global Satellite Navigation Systems (GNSS) such as the U.S. Global Positioning System. Using ITR, a vehicle's trajectory can be established in a local reference frame to within a fraction of the wavelength of the GNSS radio-frequency carrier. The ITR system combines data from a ground-based reference unit at a fixed location with data from a mobile unit on an aircraft. A single-frequency GNSS receiver in each unit provides a sequence of measurement data for each navigation satellite in view. Additional data is collected from the aircraft's radio altimeter when the aircraft passes over the threshold of the runway or other point of known height. The ITR system is used to construct position information from these measurements for precise on-aircraft positioning or remote tracking. Reference unit measurements can either be broadcast to an on-board processor which computes the trajectory, or mobile unit measurements can be transmitted to the ground for processing. ITR will work with a variety of data transmission technologies.

ITR is a reconstruction technique, in that the aircraft's trajectory is determined at the end of the time interval under analysis, after all measurements have been received. ITR employs a unique procedure to establish the exact distance from the aircraft to each of several GNSS satellites. The aircraft's position is determined from these distances using a least-squares adjustment procedure. The ITR distance-determination procedure is based on the fact that the aircraft-to-satellite distance is proportional to the total phase of the carrier signal. The total carrier phase consists of an accumulated phase and an initial integer ambiguity. While the accumulated phase is measured directly by the GNSS receiver, a separate process is required to resolve the integer ambiguities. The ambiguity resolution procedure consists of an iterative search for the correct integer set within a search volume defined by the a-priori uncertainty in aircraft's position. Because the efficiency of this search is sensitive to the search volume, the ITR system uses the aircraft's radio altimeter to constrain the search volume. A radio altimeter measurement made at the runway threshold provides vertical position measurements to help isolate the correct integer set.

The ITR system has both cost and operational advantages compared to prior approaches to aircraft tracking. The ITR system uses low-cost, commercially-available equipment and is suited to temporary installation. A single portable ground component can be transported from location to location to provide remote positioning capability. The ITR system also has independence from weather, eliminates manual tracking, and is accurate even under sub-optimal conditions of satellite geometry and multipath. The accuracy or "smoothness" of the ITR solution is of sufficient accuracy for flight inspection of all landing aids, including Category III.

DETAILED DESCRIPTION OF THE PREFERRED EMBODIMENT

Figures 1, 3:
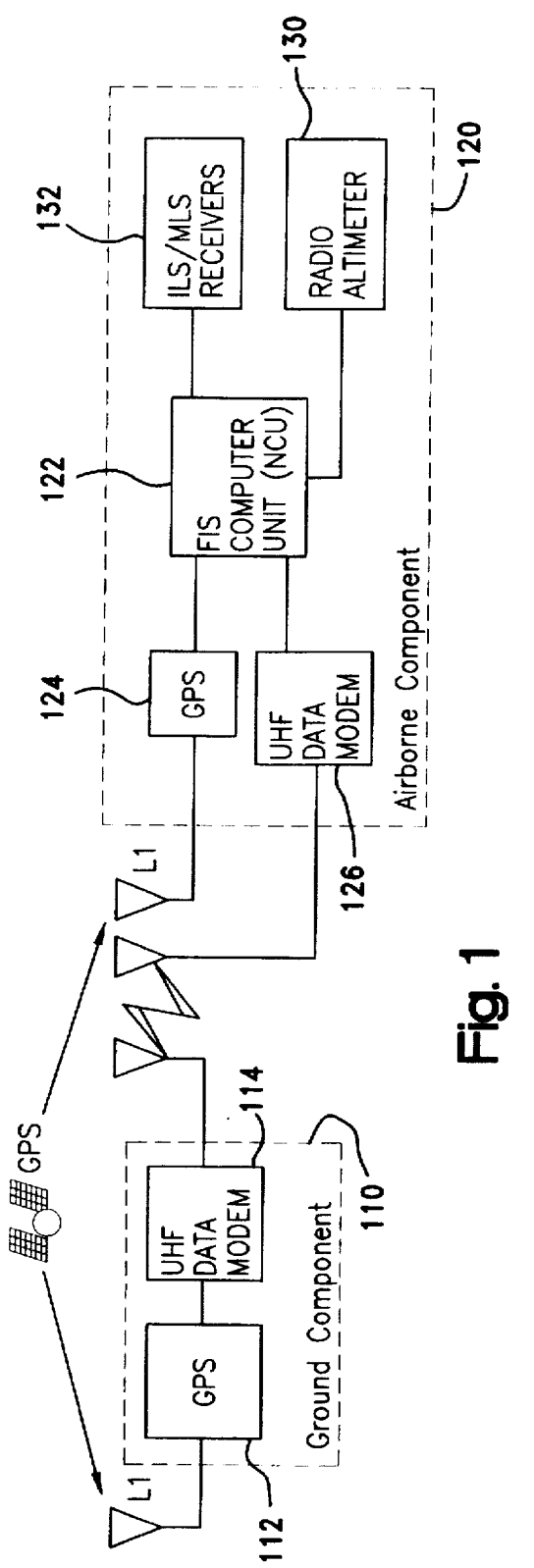
FIG. 1 is a block diagram illustrating the components of the Interferometric Trajectory Reconstruction system of the present invention.
FIG. 3 is representative test results of the present invention.

Referring initially to FIG. 1, the ITR system of the present invention includes a ground component 110 consisting of a GPS receiver 112 and a UHF transmitter or transceiver 114. The ITR system further includes an airborne component having a VME-based computer 122 (e.g., a Navigational Computer Unit (NCU) with either an embedded single-frequency GPS receiver 124 or a separate GPS sensor unit, and a UHF receiver or transmitter 126. A radio altimeter 130 is also provided in the airborne component. Although the present invention is directed toward flight inspection of radio navigation aids using airplanes, it should also be understood that the present invention also relates in a broader sense to trajectory determination for any type of airborne vehicle.

The ground component 110 of the system is installed relative to a predetermined position, for example relative to a runway threshold and the landing facility antennas. The ground component is particularly suited for temporary or portable installation. However, if the ground component is installed permanently, UHF transceivers could be substituted for the ground transmitter and airborne receiver to enable executive control of the ground component from the air. This ground-component configuration would act as an inexpensive transponder that would transmit data for a fixed time period when directed to by the airborne system.

Both the ground and the airborne units require high-quality C/A code GPS receivers with pseudo-range and carrier phase outputs. A precise GPS time pulse is also required, and high output rate (up to 10 Hz) is preferred. Accuracy of at least one meter in the horizontal plane is preferred. The GPS receivers may be of any of variety of GPS receivers well known in the art for selectively receiving a plurality of satellite signals for subsequent determination of a calculated global position of the ground or airborne component as a function of satellite range and carrier data. Preferred GPS receivers are commercially available from NovAtel Communications Ltd. of Calgary, Canada.

The UHF data link components 114, 126 are also known to those skilled in the art for establishing a data link between the ground component and the airborne component. These components are commercially available from a number of sources, for example GLB Electronics of Buffalo, N.Y. The output port of the GPS receiver 12 is connected directly to the input port of the data modem 114 in the ground component 110.

Figure 2:
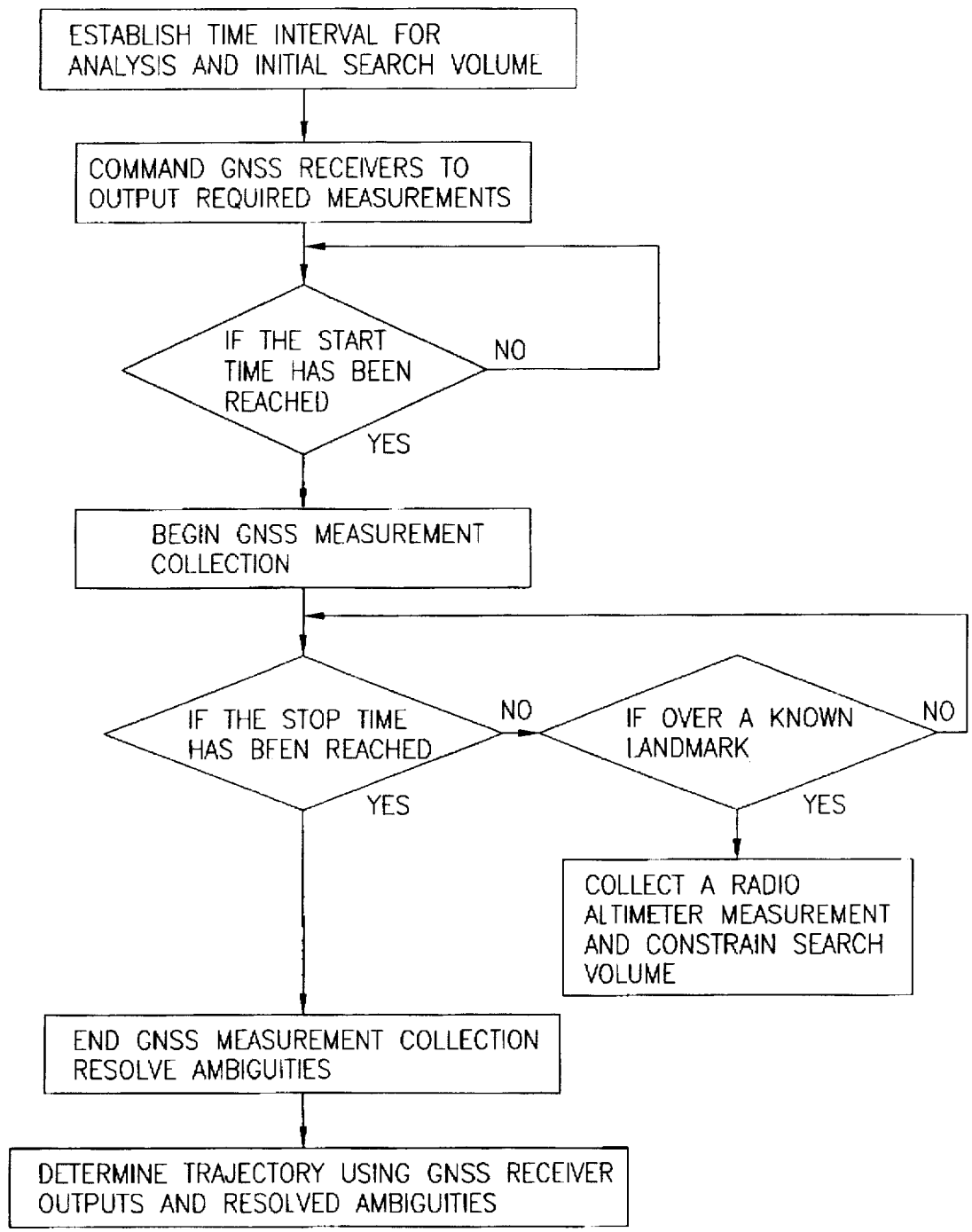
FIG. 2 is a flow chart of the process steps performed in accordance with the present invention.

For flight inspection, the system collects and stores GPS measurements from the aircraft and the ground receivers as the aircraft flies the approach. As illustrated in FIG. 2, the GPS receivers 112, 124 accumulate the difference between the phase of the $L_1$ carrier signal (1575 MHz) from each satellite and the phase of its local oscillator. The GPS receivers 112, 124 acquire the data at precisely synchronized times and automatically time-tag it. The ground-based GPS receiver 112 provides carrier-phase and pseudo-range output automatically to the data link, which modulates the data and transmits it to the airborne data-link component 126. The airborne component demodulates the data stream, sending output to the computer 122. The mobile GPS receiver 124 also provides carrier-phase and pseudo-range output directly to the flight inspection computer 122. As the aircraft flies over the runway threshold (or other point of known height), the reading from the radio altimeter 130 is also time-tagged and stored in memory in the flight inspection computer. As will be described in detail below, the aircraft position is fixed automatically over the runway using Differential GPS (DGPS) carrier smoothing and the information from the radio altimeter on the aircraft. The fix initiates a post-profile DGPS solution using the collected GPS data.

The positioning computations are done by the airborne component 120, although well-known methods of reverse DGPS can be employed to track a vehicle from a fixed site. In this case, airborne GPS and altimeter measurements are telemetered to a ground processor which uses the same methods described above. The positioning computations initially determine the double-difference pseudo-range using the C/A code and the double-difference carrier phase. Carrier smoothing is then provided to constrain the search volume, i.e., provide an initial estimate of the ambiguities in the carrier phase information. The ambiguities in the carrier phase are then resolved more accurately by using the information from the radio altimeter on the aircraft to provide precise position information. The position information can then be used to create a post-profile analysis of the aircraft trajectory.

C/A Code DGPS

The theory of C/A code DGPS positioning is well known to those skilled in the art. Reference may be had to Hatch, U.S. Pat. No. 5,177,489, for a description of the positioning algorithms. The equations below are derived from Leick's GPS Satellite Surveying, John Wiley & Sons, New York 1990. Throughout this section, the superscripts in the equations denote the satellites ("up in the sky"), and the subscripts denote receivers ("down on the Earth").

The pseudo-range from satellite "s" to the airborne receiver "a", $p^s_a(t)$, can be related to the true satellite-to-receiver range, $r^s_a(t)$, via:

$$p^s_a(t)=r^s_a(t)+Cdt_a+e^s(t) \tag{1}$$

where $Cdt_a$ is the receiver clock offset, and where $e^s(t)$ is pseudo-range error. The satellite receiver range is a function of the known satellite positions and the three position components of the airborne system, n(t), e(t), and h(t):

$$p^s_a(t)=r^s_a[n(t),e(t),h(t)]+Cdt_a+e^s(t) \tag{2}$$

Without DGPS, four such equations would be solved for the four unknowns (n, e, h, and $Cdt_a$), with errors on the order of 100 m. A single-difference pseudo-range, $P^s(t)$ is computed by differencing the airborne and ground pseudo-ranges:

$$P^s(t)=p^s_a(t)-p^s_g(t)=r^s_a(t)-r^s_g(t)+CdT+E^s(t) \tag{3}$$

Here, CdT is the combined clock offsets of the GPS receivers, and E(t) is the residual DGPS error on the order of a meter. Residual effects of group delays caused by transit of the GPS signals through the atmosphere are compensated using well-known models. With four common satellites visible, four single-difference pseudo-ranges can be solved for the three position components of the airborne receiver and the clock offset term. Alternatively, a double-difference pseudo-range, $D^s$, can be computed by differencing single differences of two satellites, "s1" and "s2":

$$D^s(t)=P^{s1}(t)-P^{s2}(t)=[r^{s1}_a(t)-r^{s1}_g(t)]-[r^{s2}_a(t)-r^{s2}_g(t)]+E^s_d(t) \tag{4}$$

The clock offset, which was identical for each single difference, cancels out by differencing. A double-difference error, $E^s_d(t)$, remains. With four satellites tracked, three such double differences could be grouped into a double-difference pseudo-range vector, $D_p(t)$, which can be expressed as:

$$D_p(t)=AP(t)=Ar_a(t)-Ar_g(t)+E_d(t) \tag{5}$$

P(t) is a vector of single-difference pseudo-ranges and A is a weighting matrix which is discussed below (See equation 22 below). Bold-face type is used to denote vector quantities throughout. Vectors $r_a(t)$ and $r_g(t)$ denote the satellite-to-receiver ranges for the air and ground components, and $E_d(t)$ is a vector of the residual errors. As with equation 4, the clock offset cancels from equation 5 because the matrix A is defined so that:

$$A1=0 \tag{6}$$

where 1 is a vector of ones and 0 is a vector of zeroes. To solve equation 5, the known quantities are grouped on the left-hand side, and errors are neglected:

$$AP(t)+Ar_g(t)=Ar_a[n(t),e(t),h(t)] \tag{7}$$

With four satellites, equation 7 is of dimension 3, so it can be solved for the three unknowns n(t), e(t), and h(t). If more than four satellites are visible, the dimension of equation 6 can be expanded, resulting in a more accurate over-determined solution. The solution of equation 6 is discussed below (See equation 18, et seq., below).

Carrier-Phase Double Differences

Significant accuracy improvement is possible by also using the $L_1$, (1575 MHz) carrier phase. Reference may be had to Remondi, U.S. Pat. No. 5,442,363, for a description of carrier phase measurement. Accumulated carrier phase is the integral of the difference between the recovered carrier from a satellite and the phase of the receiver oscillator. The solution for carrier-phase DGPS is virtually identical in form to equation 7 above. Carrier-phase outputs from the receivers are used to compute a double-difference carrier-phase solution. A vector of carrier-phase double-differences, $D_\phi(t)$, can be defined as a linear combination of single-difference carrier phases, $\Phi(t)$:

$$D_\phi(t)=A\Phi(t) \tag{8}$$

From Leick, the double-difference vector can be related to the satellite-to-antenna ranges, $r_a(t)$, by the following expression:

$$D_\phi(t)=A\Phi(t)=-(1/\lambda)Ar_a(t)+(1/\lambda)Ar_g(t)+N(0)+E_\phi(t) \tag{9}$$

where $\lambda$ is the carrier wavelength as measured at the ground, $E_\phi(t)$ represents secondary terms (Equation 11 below), and N(0) represents a vector of three double-difference integer ambiguities that must be fixed (See equation 14, et seq., below). Residual effects of group delays caused by transit of the GPS signal through the atmosphere are compensated using well-known models. With $E_\phi(t)$ and N(0) determined, the known quantities can be shifted to the left side of the equation, yielding:

$$-\lambda A\Phi(t)+\lambda N(0)+\lambda E_\phi(t)+Ar_g(t)=Ar_a(t) \tag{10}$$

Equations 10 and 7 can be solved by the same method, which is described below (see equation 18 below). However, the solution of equation 10 is much more accurate (within a few centimeters) if the correct value of the ambiguity vector, N(0), is resolved.

Physically, $\Phi(t)$ can be interpreted as measuring the antennas' relative position within an interference pattern created by the two satellites' carrier waves. Any relative movement of the airborne and ground antennas through the pattern is detected for as long as the receiver maintains lock on the satellites. Position can be determined using three unique interference patterns (requiring four satellites). The solutions herein are appropriate for four or more satellites.

Secondary Carrier-Phase Terms

From Leick, the secondary terms in equation 10 can be approximated by:

$$E_\phi'(t)=-\frac{1}{\lambda f}A[r_a-r_g]*\Delta f-\frac{1}{\lambda}A[\dot{r}_a dt_a - \dot{r}_g dt_g] \tag{11}$$

In equation 11, $\Delta f$ is a vector of the frequency offsets of the satellite signals, * denotes a vector term product, $\dot{r}_a$ and $\dot{r}_g$ are the rates of change of the antenna-to-satellite range vectors, and $dt_a$ and $dt_g$ are the receivers' clock offsets from GPS time. The second term is significant only if the receivers do not adjust their clocks so that their measurement epochs are synchronized to the GPS time standard. From Leick, the GPS satellites are in a nearly circular, 20,000-km orbit, so the average range rate is about 300 meters per second. Thus, a one-msec error introduces about a 1.9 meter error if it is not compensated for.

To compensate for this vector term, GPS receiver 124 and the ground receiver 112 provide estimates of their clock offsets accurate to the μsec-level, based on their own GPS pseudo-range solutions. The range rates can be estimated in the airborne computer by their known ephemerides, neglecting aircraft motion. Clock compensation reduces the net effect of this term to the centimeter level.

Carrier-Smoothing

As discussed above, the unknown ambiguities in the measurements (i.e., the N(0) term in equation 10) must be resolved to fix the initial position. Accumulated carrier phase can be viewed as a biased estimate of the satellite to receiver distance, with an unknown integer ambiguity that is the integer number of 19-cm. wavelengths from the satellite to the receiver at the time of lock-on. Integer ambiguities are resolved by using an iterative search for the current integer set within a search volume defined by the a-priori uncertainty in aircraft position. If the integer ambiguities are resolved (i.e., determined exactly), the position solutions are accurate to within a few centimeters.

As a step toward resolving the ambiguities, an ambiguity estimate can be made using filtered pseudo-ranges. Like the code solutions above, a carrier-smoothed solution is amenable to real time computation. Equations 4 and 10 can be combined, yielding:

$$N(0)=[\Phi(t)-(1/\lambda)P(t)]+E_N(t) \qquad (12)$$

The first term is the code-carrier residual, and the second term represents residual errors on the order of one meter. A real-valued approximation to N(0) based on equation may be several cycles different than the true integer value. Because multipath effects tend to average out over time, an improved ambiguity estimate N(t) can be made by passing the code-carrier residual through a low-pass filter, such as:

$$\tau d\tilde{N}(t)/dt+\tilde{N}(t)=[\Phi(t)-(1/\lambda)P(t)] \qquad (13)$$

The filtered estimate converges to within ± three cycles (±60 cm) of the true value of N(0). Real-time carrier-smoothed position solutions based on $\tilde{N}(t)$ are accurate to about one meter in the horizontal plane, and about two meters vertically, under normal conditions of satellite geometry and normal levels of multipath.

Ambiguity Fix Computation

For more accurate resolution of the ambiguities, the ambiguity vector is fixed at time "0" by a combination of pseudo-ranges and a radio altimeter measurement. At the instant of the fix, the left-hand sides of equation 6 and 9 can be combined, yielding the following expression for the ambiguity vector:

$$N(0)=(1/\lambda)AP(0)+A\Phi(0)-(1/\lambda)E_A(0) \qquad (14)$$

The ambiguities could be calculated from equation 14 by neglecting $E_A(t)$, but this term is not negligible. Instead, the radio altimeter measurement is combined with the known relative height of the ground GPS antenna and the threshold to produce an aircraft vertical position estimate $h_a(0)$ that can be used to improve the runway fix. The fixed aircraft-satellite range vector, $r_{fix}(0)$, is determined by solving the carrier-smoothed DGPS equation:

$$-\lambda A\Phi(0)+\lambda\tilde{N}(0)+\lambda E_\phi(0)+Ar_g(0)=Ar_a(0) \qquad (15)$$

The values of n(0), and e(0) from this solution are used with $h_a(0)$ to define $r_{fix}(O)$:

$$r_{fix}(0)=r_{fix}[n(0),e(0),h_a(0)] \qquad (16)$$

Accuracy of this solution is one meter in the local horizontal plane and one foot in the local vertical plane. The ambiguity vector is determined by solving equation 15 using the methods described below (Equation 18, et seq.), defining $r_{fix}(0)$, and computing the ambiguities via:

$$N(0)=A\Phi(0)+(1/\lambda)[Ar_{fix}(0)-Ar_g(0)] \qquad (17)$$

It does not matter whether the computations above result in an integer value. The real-valued estimate of N(0) is substituted directly into equation 9.

It is noted that the radio altimeter might provide an error which would create a bias in the solution. Furthermore, the carrier-smoothed north-east positions may be in error. These biases can be corrected using ambiguity resolution techniques as should be known to those skilled in the art such that the final position solution is accurate to a few centimeters. In this case, the solution of equation 17 provides an improved centroid for the search volume as compared to equation 14, which is the usual definition for the centroid. Furthermore, the search volume is defined by the uncertainty of equation 17, which is smaller than the uncertainty in equation 14. The smaller search volume substantially improves the performance of ambiguity resolution. Ambiguity resolution techniques to account for errors in the altimeter reading will not be reproduced herein for sake of brevity. It is also pointed out that the radio altimeter may be calibrated before the flight by techniques known to those skilled in the art to remove bias errors. The remaining noise level in the altimeter is less than one foot.

Solution of Double-Difference Equations

The DGPS position computation has been reduced to the solution of the general equation:

$$D(t)+Ar_g(t)=Ar_a(t) \qquad (18)$$

Where D(t) is either a code or ambiguity-fixed carrier-phase double difference, that is, both equation 7 and equation 10 can be solved using the same algorithm. Equation 18 also is a function of satellite position coordinates and ground station position coordinates. The satellites' positions can be determined in their WGS-84 cartesian coordinates, $u^j(t)$, $v^j(t)$, and $w^j(t)$, using the standard ephemeris algorithm developed by Rockwell Corp., ICD-GPS-200. This algorithm requires a set of orbital parameters that are transmitted by the satellites. A set of ephemeris parameters are obtained from the airborne GPS receiver at the start of real-time DGPS calculations, and a second set is acquired over the threshold for post-profile calculations.

The aircraft position is defined in a Cartesian north-east-up reference frame centered at the ground antenna, whose coordinates $u_g$, $v_g$, and $w_g$ are known. In practice, these need not be known to great accuracy, but to fix the trajectory relative to a local coordinate system, the relative location of the ground antenna must be known to within the local system to the desired accuracy. The range from the ground antenna "g" to satellite "j," $r^j_g(t)$, is computed by:

$$r^j_g(t) = \sqrt{(u^j - u_g)^2 + (v^j - v_g)^2 + (w^j - w_g)^2} \qquad (19)$$

Similarly, the range from the airborne antenna "a" to satellite "j," $r^j_a(t)$, can be expressed as:

$$r^j_a(t) = \sqrt{(u^j - u_a)^2 + (v^j - v_a)^2 + (w^j - w_a)^2} \qquad (20)$$

The three or more equations of 18 are solved for $u_a(t)$, $v_a(t)$, and $w_a(t)$ by recursive least-squares iteration (Equation 23 below). Once the WGS-84 coordinates of the aircraft are known, they can be converted to local north-east-up coordinates by a linear transformation:

$$\begin{bmatrix} n(t) \\ e(t) \\ h(t) \end{bmatrix} = T(u_g,v_g,w_g) \begin{bmatrix} u_a(t) \\ v_a(t) \\ w_a(t) \end{bmatrix} \qquad (21)$$

To compute the solution, both receivers must track at least four common satellites at any time. In the simplest case, four common satellites are tracked by both receivers during the entire flight inspection maneuver. However, some software "bookkeeping" may be required in case the satellite set must be switched during the solution, which should be known to those skilled in the art.

Definition of Weighting Matrix

The weighting matrix, A, must be defined to satisfy the relationship of equation 6, but this leaves some freedom to select A to improve the solution. For example, A could be defined as:

$$\begin{bmatrix} 0 & 0 & 1 & -1 \\ 0 & 1 & 0 & -1 \\ 1 & 0 & 0 & -1 \end{bmatrix} \quad (22)$$

This satisfies equation 6, but it weighs the fourth satellite's data more heavily than the other three. Other weighting matrices could of course be used, as should be apparent to those skilled in the art. While the choice of A is not critical to the solution, a good choice makes for better robustness. If more than the minimum of four satellites are used, an equal number of rows and columns are added to A.

Recursive Least-Squares Iteration

The solution of equation 18 is performed by a standard least-squares iteration. To start the procedure, an initial guess, $x_0(t)$ is made as to the aircraft position $x(t)$ (i.e., the coordinates $u_a(t)$, $v_a(t)$, and $w_a(t)$). The GPS receiver position output is used to initialize iteration of the runway fix solution (equation 13), while the previous position solution is used to initialize iteration of all subsequent solutions. For the solution at an arbitrary time t, the initial guess $x_0(t)$ is used to define an estimate of the aircraft-to-satellite range $Ar_{a0}(t)$, which is used to form a second guess, $x_1(t)$, according to:

$$x_1(t) = x_0(t) + K_0[D(t) + Ar_g(t) - Ar_{a0}(t)] \quad (23)$$

The gain matrix, $K_0$, is based on a matrix of directional cosines of the aircraft-to-satellite range vectors. The directional cosines are not sensitive to the exact position, so the directional cosine matrix will be based on the ground station position. Equation 23 is applied recursively; that is, $x_1(t)$ is used to generate $x_2(t)$ by repeating the procedure. The gain matrix is scaled down after the first iteration. The iteration is stopped after a fixed number of iterations.

Test Results

The accuracy of the above-described system has been confirmed in a prototype flight reference system. The airborne module consisted of a 486 notebook computer and docking station containing a NovAtel 951R 10-channel GPS Card and Synthesized Netlink Radio Data System (SNRDS) provided by GLB Electronics. The ground station consisted of a NovAtel 2151R receiver, 386 notebook computer, and a second SNRDS. Truth data were provided by post-positioning DGPS data from Ashtech Z-12 dual frequency P-Code tracking GPS receivers using PNAV software. The maneuvers tested included seventeen landing approaches flown from five nautical miles to the airport where the ground unit was installed. Real time and post-processed DGPS solutions were compared to the Ashtech PNAV solutions. Summary statistics are presented in the table Of FIG. 3. The ambiguity-fixed solutions were found to be significantly better than the C/A code or carrier smootherd solutions. The accuracy of the ITR solution is defined by a fix accuracy bias plus a few centimeters error. Prior to ambiguity resolution the fix bias is given by the carrier-smoothed code solution for horizontal and by the radio altimeter for the vertical. Successful resolution of the ambiguities reduces this error to zero.

These results confirm that ITR meets all flight inspection requirements, without inertial systems or survey-grade equipment. Once a base station is established, interferometric techniques can provide the same capabilities as a fully-automatic flight inspection system. Thus, as described above, ITR technology provides a new alternative for flight inspection that offers many of the advantages of AFIS at a lower cost.

Additional capabilities are provided by integration of INS with DGPS. INS can provide the short-term continuity of positioning in case of a brief loss in telemetry. Cycle-slip detection is possible by comparison with stabilized integrated vertical acceleration. When integrated with an existing AFIS, DGPS can be used for dynamic estimation of horizontal drift rate, eliminating the requirement for a second position-fix. This capability becomes somewhat more useful in an existing source of differential corrections is available so that landing of the aircraft is not necessary.

DGPS can also be combined with RTT, laser trackers, Microwave Landing Systems (MLS) or Instrument Landing Systems (ILS) to support existing semi-automatic operations. A MLS/ILS unit is identified for reference purposes at 32 in FIG. 1. Combining DGPS with other systems provides a complete solution in real time with excellent coverage and accuracy.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims. For example, another application of the principles of the present invention is for portable, self-contained flight inspection systems for flight inspection of GPS approaches. Such a system would have low cost and minimal aircraft integration requirements. A broad range of other applications are possible outside of flight inspection, such as range tracking.

What is claimed is:

1. A method for determining the trajectory of an airborne antenna with respect to a ground-based antenna in a satellite-based trajectory system, comprising the steps of:

making carrier phase measurements based on the reception of a carrier signal from each of a plurality of N satellites, where N is the minimum number of satellites needed to compute the relative position of the airborne antenna;

deriving from the carrier phase measurements an initial set of potential solutions for the trajectory, wherein the initial set of potential solutions all fall within a region of uncertainty defined by a centroid, and wherein multiple potential solutions arise because of whole cycle ambiguity in the carrier signal;

positioning the ground-based antenna at a predetermined first location relative to the trajectory;

making a measurement of the vertical position of the airborne antenna at a predetermined second location; and generating solutions with improved accuracy in trajectory.

2. The method as defined in claim 1, further comprising the steps of:

making range code measurements based on the reception of a range code signal from each of the plurality of N satellites;

deriving from the range code measurements a pseudo-range measurement of the position of the airborne antenna relative to the ground-based antenna;

improving the accuracy of the initial set of potential solutions based on comparing the first solution set with the pseudo-range measurements.

3. A method for determining the trajectory of an aircraft having an airborne antenna with respect to a ground-based antenna in a satellite-based trajectory system, comprising the steps of:

making carrier phase measurements based on the reception of a carrier signal from each of a plurality of N satellites, where N is the minimum number of satellites needed to compute the relative position of the airborne antenna;

deriving from the carrier phase measurements an initial set of potential solutions for the trajectory, wherein the initial set of potential solutions all fall within a region of uncertainty defined by a centroid, and wherein multiple potential solutions arise because of whole cycle ambiguity in the carrier signal;

positioning the ground-based antenna at a runway threshold in the trajectory of the aircraft;

making a vertical position measurement using a radio altimeter on the aircraft when the aircraft passes over the runway threshold;

generating solutions with improved accuracy in trajectory based on the vertical position measurement resolving the ambiguity in the carrier signal at the second location.

4. A system for determining the trajectory of an aircraft having an airborne antenna with respect to a ground-based antenna in a satellite-based trajectory system, comprising:

measurement means for making carrier phase measurements based on the reception of a carrier signal from each of a plurality of N satellites, where N is the minimum number of satellites needed to compute the relative position of the airborne antenna;

computing means for deriving from the carrier phase measurements a first initial set of potential solutions for the trajectory, wherein the first initial set of potential solutions all fall within a region of uncertainty defined by a centroid, and wherein multiple potential solutions arise because of whole cycle ambiguity in the carrier signal;

the ground-based antenna being positioned at a runway threshold in the trajectory of the aircraft;

a radio altimeter on the aircraft for providing a vertical position measurement when the aircraft passes over the runway threshold;

said computing means generating solutions with improved accuracy based on the vertical position measurement resolving the ambiguity in the carrier signal at the second location.

5. The system as defined in claim 4, further including a ground-based station having said ground-based antenna and data link transmitter means for transmitting the carrier phase signals to an airborne station in the aircraft, said airborne station including data link receiver means for receiving said carrier phase signals.

* * * * *